US011646892B2

(12) United States Patent
Bogineni et al.

(10) Patent No.: US 11,646,892 B2
(45) Date of Patent: May 9, 2023

(54) METHOD AND SYSTEM FOR BLOCKCHAIN-BASED INFORMATION MANAGEMENT AMONG NETWORK DEVICES

(71) Applicant: Verizon Patent and Licensing Inc., Basking Ridge, NJ (US)

(72) Inventors: Kalyani Bogineni, Irving, TX (US); Mohan Palat, Shrewsbury, MA (US); Ratul K. Guha, Warwick, PA (US); Sudhakar Reddy Patil, Flower Mound, TX (US); Jignesh S. Panchal, Hillsborough, NJ (US); Kristen Sydney Young, Morris Plains, NJ (US); Hans Raj Nahata, New Providence, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 210 days.

(21) Appl. No.: 17/083,476

(22) Filed: Oct. 29, 2020

(65) Prior Publication Data
US 2022/0141025 A1 May 5, 2022

(51) Int. Cl.
*H04L 29/06* (2006.01)
*H04L 9/32* (2006.01)
*H04L 9/00* (2022.01)

(52) U.S. Cl.
CPC .......... *H04L 9/3236* (2013.01); *H04L 9/3255* (2013.01); *H04L 9/50* (2022.05); *H04L 2209/34* (2013.01); *H04L 2209/56* (2013.01)

(58) Field of Classification Search
CPC .. H04L 9/50; H04L 2209/56; H04L 2209/534
USPC .......................................................... 713/156
See application file for complete search history.

(56) References Cited

U.S. PATENT DOCUMENTS

2020/0195495 A1\* 6/2020 Parker .................. H04L 41/082
2021/0056540 A1\* 2/2021 McCauley ........... G06Q 20/223

\* cited by examiner

*Primary Examiner* — Evans Desrosiers

(57) ABSTRACT

A method, a device, and a non-transitory storage medium are described in which an blockchain-based network information management service is provided. The service provides blockchain mechanisms that allows for the management and disbursement of network information among network devices of a RAN, a core network, and an application layer network. The service may define a structure for the network information that may be used by RAN devices, core devices, and application layer devices of different vendors and third parties.

20 Claims, 10 Drawing Sheets

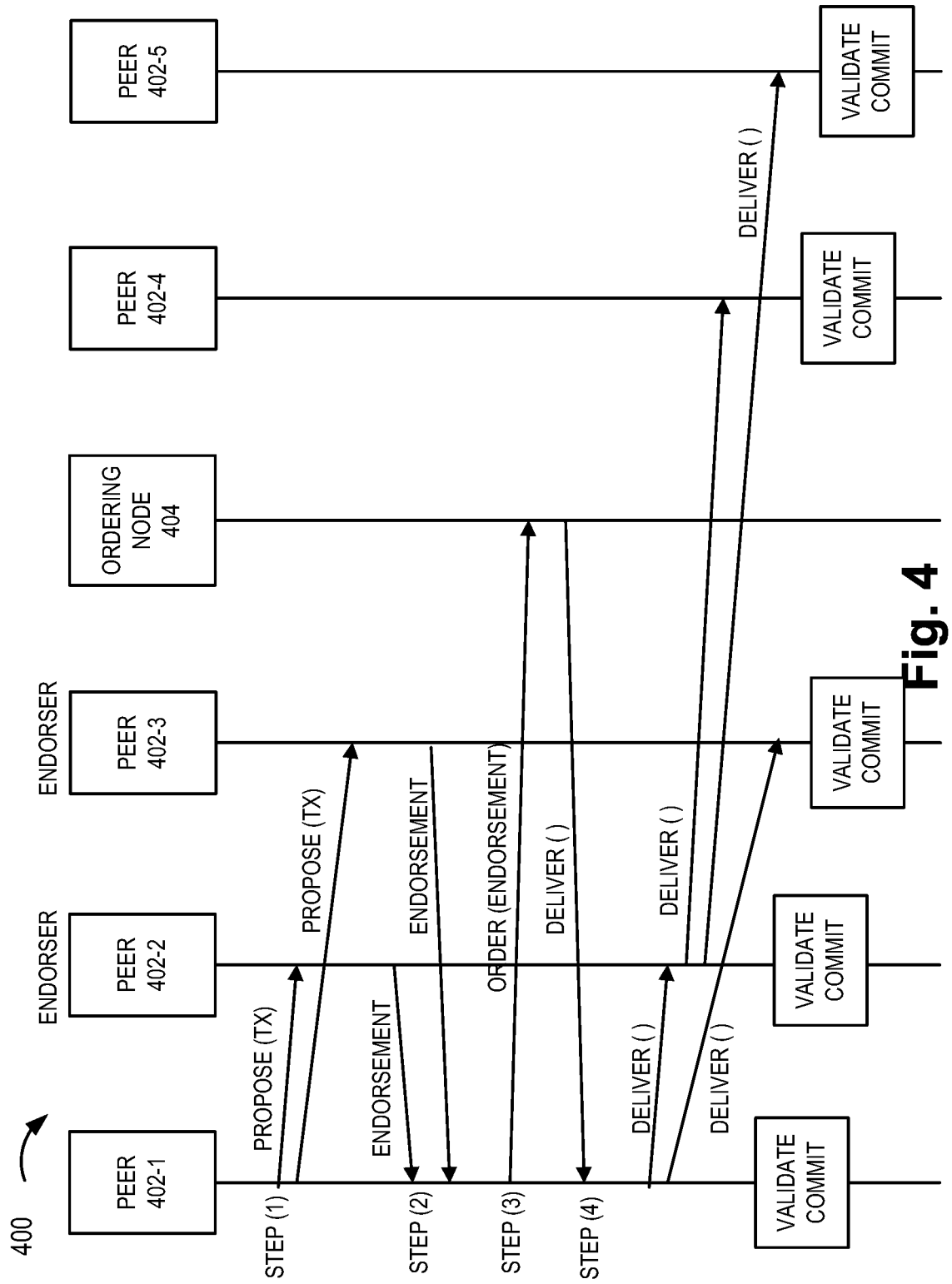

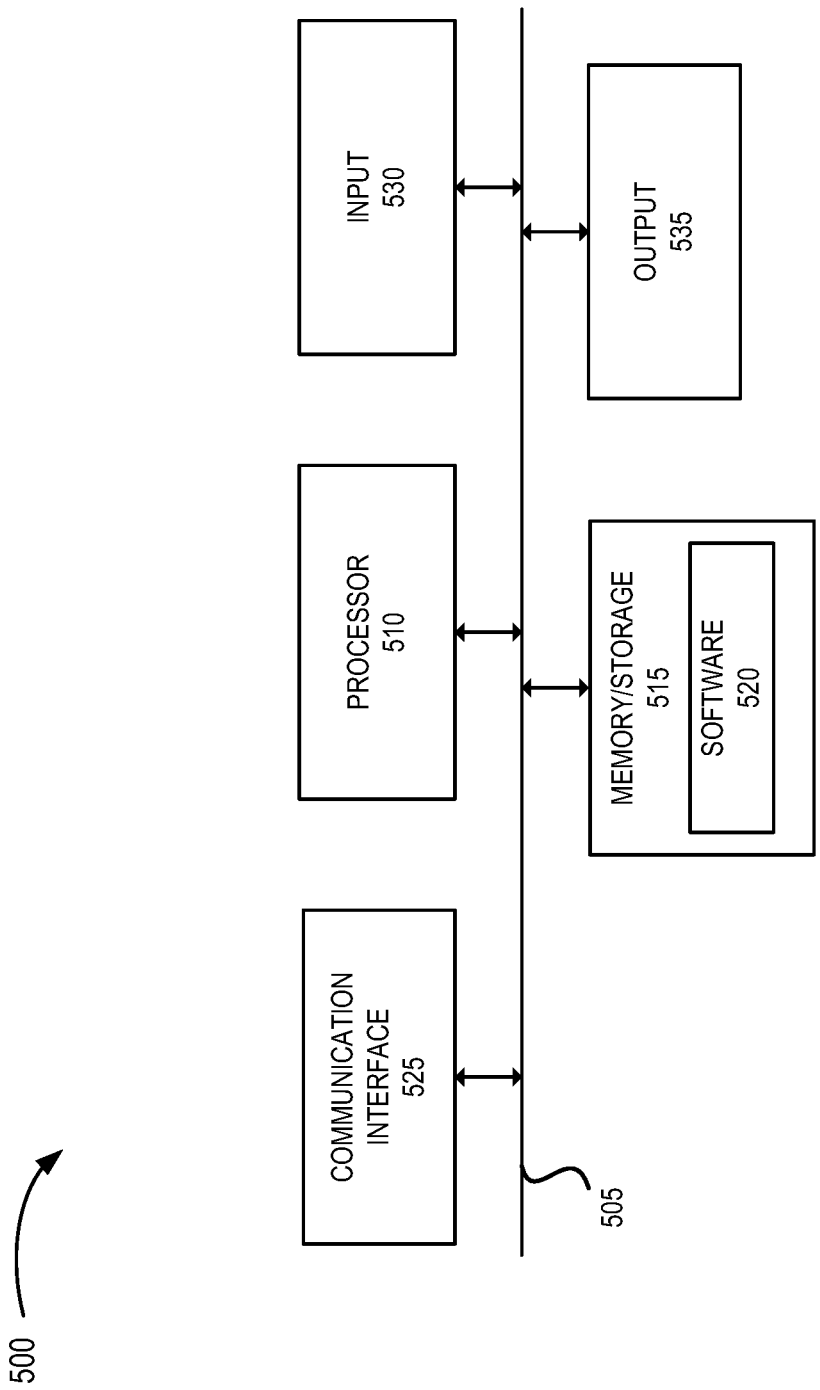

US 11,646,892 B2

METHOD AND SYSTEM FOR BLOCKCHAIN-BASED INFORMATION MANAGEMENT AMONG NETWORK DEVICES

BACKGROUND

Development and design of radio access networks (RAN) and core networks present certain challenges from a network-side perspective and an end device perspective. For example, depending on the configurations from both network-side and end device-side perspectives, such configurations may reduce the effective use of resources, impact the provisioning of a wireless service and/or an application service, and their accessibility and use by end devices. Accordingly, a need exists to overcome these challenges.

BRIEF DESCRIPTION OF THE DRAWINGS

FIG. 3A is a diagram illustrating exemplary components of the blockchain-based network information management service;

FIG. 4 is a diagram illustrating yet another exemplary process of an exemplary embodiment of the blockchain-based network information management service;

FIG. 5 is a diagram illustrating exemplary components of a device that may correspond to one or more of the devices illustrated and described herein.

DETAILED DESCRIPTION

Figure 1:
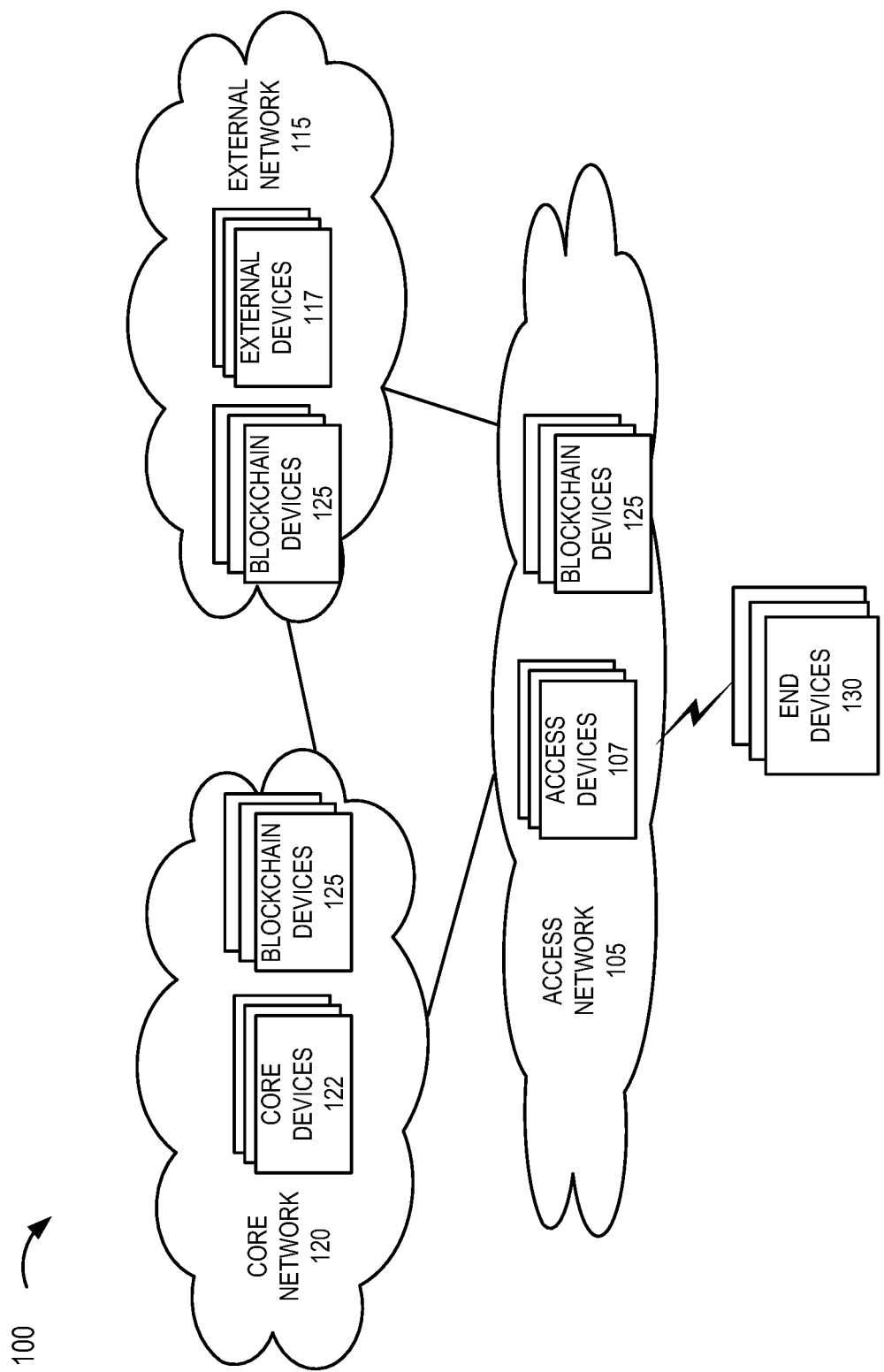
FIG. 1 is a diagram illustrating an exemplary environment in which an exemplary embodiment of a blockchain-based network information management service may be implemented.

The following detailed description refers to the accompanying drawings. The same reference numbers in different drawings may identify the same or similar elements. Also, the following detailed description does not limit the invention.

The provisioning of a wireless service and various application services to an end device may involve the exchange of information among various network devices, network functions (NFs), network elements (NEs), and/or virtualized devices (e.g., virtualized network devices, virtualized network elements, virtualized network functions) (referred to herein as network devices or network device). Additionally, in a network such as a RAN, a core network, and/or an application layer network, the network devices may structure and store various types of information (e.g., context information, subscription information, state information, network configuration information, or other types of information) in different manners among different vendors of the network devices. Consequently, the information or instances of the information may not be shared between network devices of different vendors. Additionally, there are not mechanisms in place that provide for the sharing of information with third party application servers, for example.

Given the sensitive nature and potential exposure of the information when communicated, security issues (e.g., eavesdropping, sabotage, data integrity, etc.) and other issues (e.g., latency) pertaining to the wireless service and/or application service may be of concern.

According to exemplary embodiments, a blockchain-based network information management service is described. According to an exemplary embodiment, the blockchain-based network information management service may support the communication of various types of network information among network devices of different vendors and third parties in a network. For example, the network information may include subscription information, state information, context information, network configuration information, application information, and other information that may support a wireless service and/or an application service associated with a network and an end device.

According to an exemplary embodiment, the blockchain-based network information management service may use blockchain mechanisms that support the distribution and secure communication of network information among network devices, as described herein. For example, peer nodes of a blockchain network may allow various network devices of a RAN, a core network, an application layer network, or other type of network access to the network information for use, as described herein. According to other examples, the network devices may retrieve the network information from peer nodes and store the network information for use, as described herein.

According to an exemplary embodiment, the blockchain-based network information management service may specify a defined structure for the network information, as described herein. For example, the structure of the network information may be defined by a network operator of a RAN and core network. According to an exemplary embodiment, the blockchain-based network information management service may use a peer-to-peer (P2P) protocol (e.g., Gossip protocol or other P2P protocol) to distribute the network information versus a protocol (e.g., Packet Data Convergence Protocol (PDCP), Radio Resource Control (RRC) Protocol, Service Data Adaptation Protocol (SDAP), etc.) and/or a protocol stack (e.g., radio protocol stack, Fifth Generation (5G) protocol stack, Fourth Generation (4G) protocol stack, or future generation protocol stack) of a network standard (e.g., Third Generation Partnership Project (3GPP), International Telecommunication Union (ITU), European Telecommunications Standards Institute (ETSI), GSM Association (GSMA), etc.) that may pertain to the network devices in the network.

According to an exemplary embodiment, the blockchain-based network information management service may be implemented in a RAN, a core network, an application layer network, a 4G network, a 5G network, a future generation network (e.g., Sixth Generation (6G) network and beyond), or other type of network (e.g., X-haul network, transport network, etc.).

In view of the foregoing, the blockchain-based network information management service may provide for the secure communication of network information among network devices of different vendors and third parties in a network. The blockchain-based network information management service may also provide a defined or common structure for the network information which may eliminate disparate structures and/or types of network information that are used among different vendors and/or third parties. The blockchain-based network information management service may improve the distribution of network information among the various network devices of a RAN, a core network, and an application layer network, for example, which may be associated with different vendors and/or third parties, and the use of the network information in support of the provisioning of a wireless service and/or an application service.

FIG. 1 is a diagram illustrating an exemplary environment 100 in which an exemplary embodiment of the blockchain-based network information management service may be implemented. As illustrated, environment 100 includes access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes blockchain devices 125 and end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, external network 115 or core network 120 may be omitted. Additionally, or alternatively, other networks not illustrated in FIG. 1 may be included, such as an X-haul network (e.g., backhaul, mid-haul, fronthaul, etc.), as described herein.

The number, the type, and the arrangement of network devices, and the number of end devices 130 are exemplary. For example, according to other exemplary embodiments, blockchain devices 125 may not be in core network 120 and/or external network 115. In this regard, the number and arrangement of blockchain devices 125 may be implemented differently than illustrated and described. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the blockchain-based network information management service may use at least one of these planes of communication. Additionally, an interface of a network device may support the communication (e.g., transmission and reception of messages, information elements (IE), attribute value pairs (AVPs), network information, etc.) between network devices and may support the blockchain-based network information management service, as described herein. According to various exemplary implementations, the interface of a network device may be a service-based interface, a reference point-based interface, an O-RAN interface (e.g., virtual and/or proxy), a future generation interface, or other type of interface. Also, according to various exemplary implementations, the interface of the network device may be a modified interface relative to an interface defined by an entity, such as 3GPP, ITU, ETSI, GSMA, Open RAN (O-RAN) Alliance, or other entity that may define a network standard for an interface) or a new interface of the network device.

Access network 105 may include one or multiple networks of one or multiple types and technologies. For example, access network 105 may be implemented to include a 5G-access network (5G-AN) or a 5G-RAN, a future generation RAN (e.g., a 6G RAN or subsequent generation RAN). Access network 105 may include a legacy RAN (e.g., a Third Generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), an optical network, or another type of network that provides access to or can be used as an on-ramp to access network 105, external network 115, and/or core network 120.

Access network 105 may include different and multiple functional splitting, such as options 1, 2, 3, 4, 5, 6, 7, or 8 that relate to combinations of access network 105 and core network 120 including an Evolved Packet Core (EPC) network and/or a NG core (NGC) network, or the splitting of the various layers (e.g., physical layer, Media Access Control (MAC) layer, RLC layer, and PDCP layer, etc.), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., non-standalone (NSA) NR, standalone (SA) NR, etc.).

According to some exemplary embodiments, access network 105 may be implemented to include various architectures of wireless service, such as, for example, macrocell, microcell, femtocell, picocell, metrocell, new radio (NR) cell, Long Term Evolution (LTE) cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum, above mm wave), and/or other attributes or technologies used for radio communication.

Depending on the implementation, access network 105 may include one or multiple types of network devices, such as access devices 107. For example, access device 107 may include a next generation Node B (gNB), an evolved Long Term Evolution (eLTE) eNB, an eNB, a radio network controller (RNC), a remote radio head (RRH), a baseband unit (BBU), a radio unit (RU), a CU, a CU control plane (CU CP), a CU user plane (CU UP), a DU, a small cell node (e.g., a picocell device, a femtocell device, a microcell device, a home eNB, etc.), open network devices (e.g., O-RAN Centralized Unit (O-CU), O-RAN Distributed Unit (O-DU), O-RAN next generation Node B (O-gNB), O-RAN evolved Node B (O-eNB)), 5G ultra-wide band (UWB) nodes, a future generation wireless access device (e.g., a 6G wireless station, a seventh generation (7G) wireless station, etc.), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple RATs (e.g., 4G and 5G functionality, 5G and 5.5G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device.

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), 2D beamforming, antenna spacing, tilt (relative to the ground), radiation pattern, directivity, elevation, planar arrays, and so forth.

According to an exemplary embodiment, access device 107 may include logic that provides the blockchain-based network information management service, as described herein. For example, access device 107 may include blockchain logic that provides a service associated with a blockchain node, such as a peer node, an ordering node, an endorser node, and/or other type of node of a blockchain network, as described herein. By way of further example, the blockchain logic may include the management and dissemination of a ledger or portion of a ledger (e.g., a block) of network information, as described herein. According to another exemplary embodiment, the blockchain logic provides access to or retrieval and storage of network information from a node of a blockchain network, as described herein.

External network 115 may include one or multiple networks of one or multiple types and technologies. For example, external network 115 may be implemented to include a service or an application-layer network, a cloud network, a private network, a public network, a multi-access edge computing (MEC) network (also known as a mobile edge computing network), a fog network, the Internet, a service provider network, the World Wide Web (WWW), an Internet Protocol Multimedia Subsystem (IMS) network, a Rich Communication Service (RCS) network, software defined network (SDN), a virtual network, a packet-switched network, a data center, or other type of network that may provide access to and may host an end device application, service, or asset (also referred to as an "application service").

Depending on the implementation, external network 115 may include various network devices such as external devices 117. For example, external devices 117 may include servers (e.g., web, application, cloud, etc.), mass storage devices, data center devices, network function virtualization (NFV) devices, containers, virtual machines, SDN devices, cloud computing devices, platforms, and other types of network devices, platforms, and/or architectures pertaining to various network-related functions (e.g., security, management, charging, billing, authentication, authorization, policy enforcement, development, etc.).

According to an exemplary embodiment, external devices 117 may include a network device that provides the blockchain-based network information management service, as described herein. For example, external device 117 may include blockchain logic that provides a service associated with a blockchain node, such as a peer node, an ordering node, an endorser node, and/or other type of node of a blockchain network, as described herein. By way of further example, the blockchain logic may include the management and dissemination of a ledger or portion of a ledger (e.g., a block) of network information, as described herein. According to another exemplary embodiment, the blockchain logic provides access to or retrieval and storage of network information from a node of a blockchain network, as described herein.

External devices 117 may host one or multiple types of application services. The application services may or may not pertain to the blockchain-based network information management service, as described herein. For example, the application services may pertain to broadband services in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text, voice, conferencing, instant messaging, etc.), video streaming, and/or other types of wireless application services.

Core network 120 may include one or multiple networks of one or multiple network types and technologies. Core network 120 may include a complementary network of access network 105. For example, core network 120 may be implemented to include an NGC network, an Evolved Packet Core (EPC) of an LTE network, an LTE-Advanced (LTE-A) network, and/or an LTE-A Pro network, a future generation core network (e.g., a 6G or beyond core network, etc.), and/or another type of core network.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.).

According to some exemplary embodiments, core devices 122 may include a network device that provides the blockchain-based network information management service, as described herein. For example, core device 122 may include blockchain logic that provides a service associated with a blockchain node, such as a peer node, an ordering node, an endorser node, and/or other type of node of a blockchain network, as described herein. By way of further example, the blockchain logic may include the management and dissemination of a ledger or portion of a ledger (e.g., a block) of network information, as described herein. According to another exemplary embodiment, the blockchain logic provides access to or retrieval and storage of network information from a node of a blockchain network, as described herein.

End devices 130 include a device that may have computational and/or communication capabilities (e.g., wireless, wired, optical, etc.). End device 130 may be implemented as a mobile device, a portable device, a stationary device (e.g., a non-mobile device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, end device 130 may include one or multiple communication interfaces that provide one or multiple (e.g., simultaneous) connections via the same or different RATs, frequency bands, carriers, network slices, and/or other communication medium (e.g., wired, etc.). The multimode capabilities of end device 130 may vary among end devices 130.

Figure 2A:
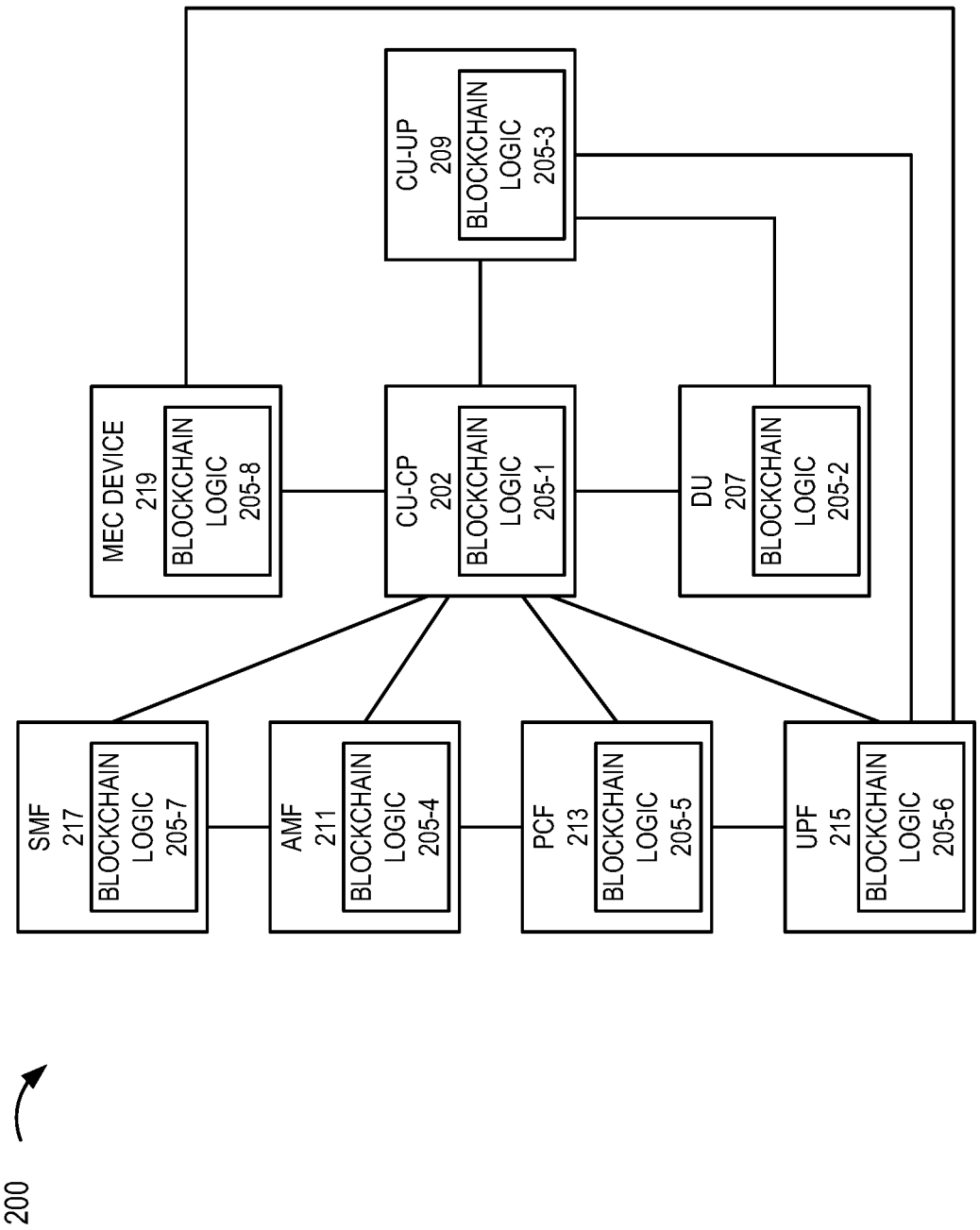
FIG. 2A is a diagram illustrating another exemplary environment in which an exemplary embodiment of the blockchain-based network information management service may be implemented.

FIG. 2A is a diagram illustrating another exemplary environment 200 in which an exemplary embodiment of the blockchain-based network information management service may be implemented. As illustrated, environment 200 includes a CU-CP 202, a DU 207, a CU-UP 209, an AMF 211, a PCF 213, a UPF 215, an SMF 217, and a MEC device 219. As further illustrated, these network devices include blockchain logic 205-1 through 205-8 (also referred to individually or generally as blockchain logic 205). According to other embodiments, additional, different, and/or fewer network devices of a RAN, a core network, an application layer network and/or other type of network may be implemented with blockchain logic 205. For example, the DU may be implemented as split network devices (e.g., DU-UP and DU-CP), a DU and an RU may be combined, or a DU may be a physical network function (PNF). Additionally, or alternatively, a CU-UP and a CU-CP may be integrated. The number, type, and arrangement of network devices are exemplary. As previously mentioned, the blockchain-based network information management service may provide for the exchange of network information among different vendors of network devices. For example, CU-CP 202, AMF 211, and SMF 217 may be of different vendors that reside in an operator's RAN and core network. Additionally, for example, MEC device 219 may be a network device of a third party that provides an application service. By way of further example, MEC device 219 may be a server device in a MEC network that provides the application service to end device 130. According to an exemplary embodiment, access to network information by a third party network device may be subject to authentication and/or authorization mechanisms.

Environment 200 also includes communication links between these network devices. The number, type, and arrangement of communication links illustrated in environment 200 are exemplary. For example, additional, fewer, and/or different communication links between the network devices illustrated may be implemented. In this regard, various blockchain networks or blockchain sub-networks may be formed.

Figure 2B:
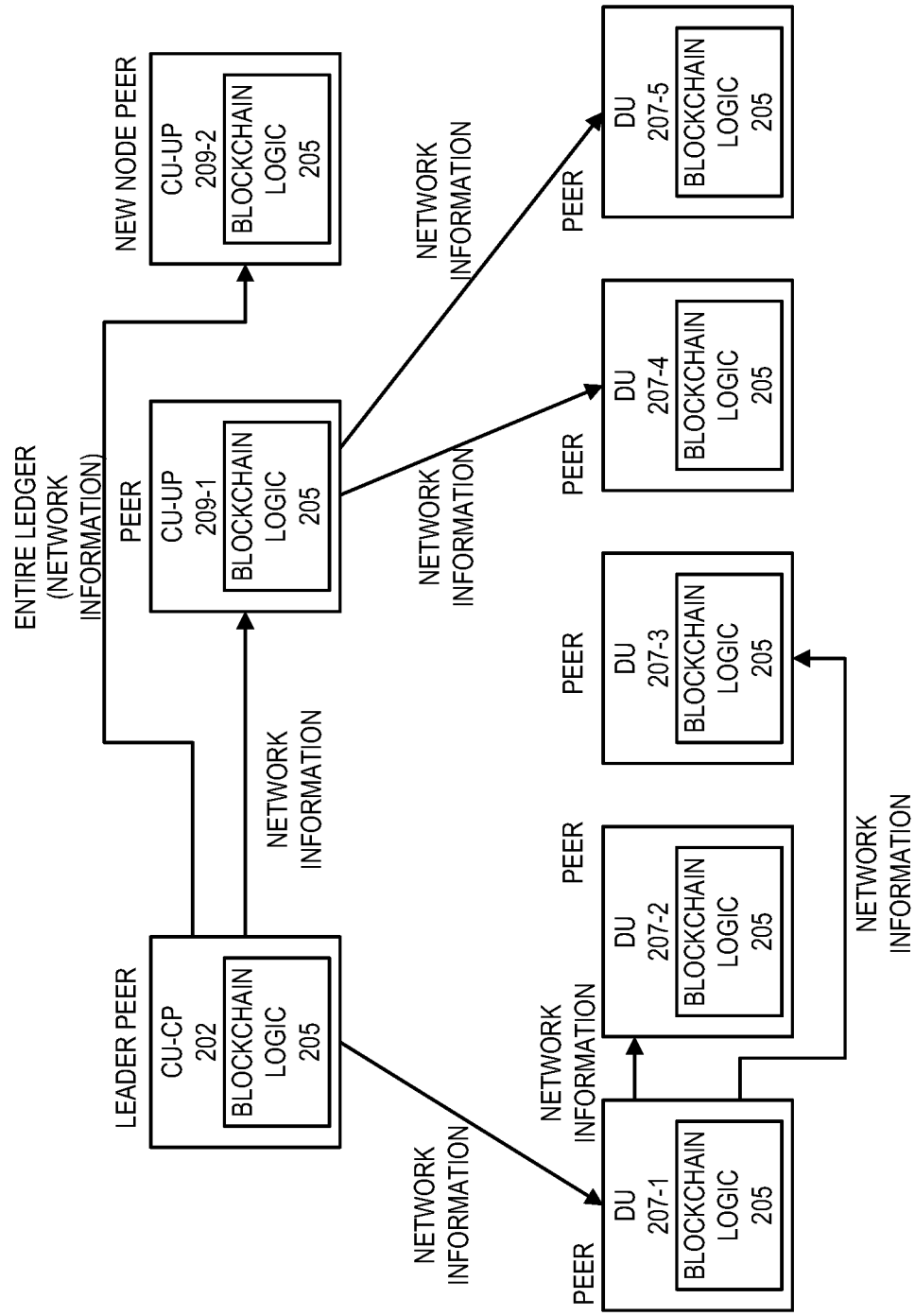
FIG. 2B is a diagram illustrating an exemplary process of the blockchain-based network information management service.

FIG. 2B is a diagram illustrating an exemplary process 230 of the blockchain-based network information management service. With FIG. 2A in mind, referring to FIG. 2B, assume that CU-CP 202 is a leader peer and receives a block of network information from an ordering service node (not illustrated). According to another embodiment, CU-CP 202 may provide an ordering service, as described herein. In either case, CU-CP 202 may distribute the network information to CU-UP 209-1 (peer) and DU 207-1 (peer). In turn, based on the Gossip protocol, DU 207-1 disseminates the network information to other peers, such as DU 207-2 and DU 207-3. Additionally, CU-UP 209-1 may disseminate the network information to other peers, such as DU 207-4 and DU 207-5. As further illustrated, CU-CP 202 may provide the entire ledger of network information to a new peer, such as (new) CU-UP 209-2.

As previously described, the blockchain-based network information management service may support the communication of various types of network information among network devices of different vendors and third parties in a network. For example, the network information may include subscription information associated with end device 130, UE/user information, application information, state information, context information, network configuration information, and other information that may support a wireless service and/or an application service associated with a network and an end device. For example, the network information may pertain to a frequency band, a bandwidth, an NSA configuration, an SA configuration, data radio bearer (DRB) identifier, Quality of Service (QoS) flow level parameters, network slice information and identifier (e.g., Single Network Slice Selection Assistance Information (S-NSSAI)), NSSAI to CU-UP/DU mappings, and other type of information that may be used for the establishment, maintenance, and teardown of a wireless service and/or an application service between end device 130 and network devices, or other network procedures (e.g., attachment, handover, congestion control, etc.) included in a RAN, a core network, an application layer network (e.g., a MEC network, etc.), as described herein. As such, the network information, as described herein, that may otherwise be communicated via standardized network signaling messages (e.g., bearer context setup/modify messages, E1 setup/configuration update messages, F1 setup/DU configuration messages, and other messages), interfaces (e.g., E1, F1-C, and other interfaces), and various network devices (e.g., CU-CP, CU-UP, DU, AMF, UPF, PCF, and/or other access devices 107, core devices 122, external devices 117, as described herein) may be provided by the blockchain-based network information management service, as described herein.

Figure 2C:
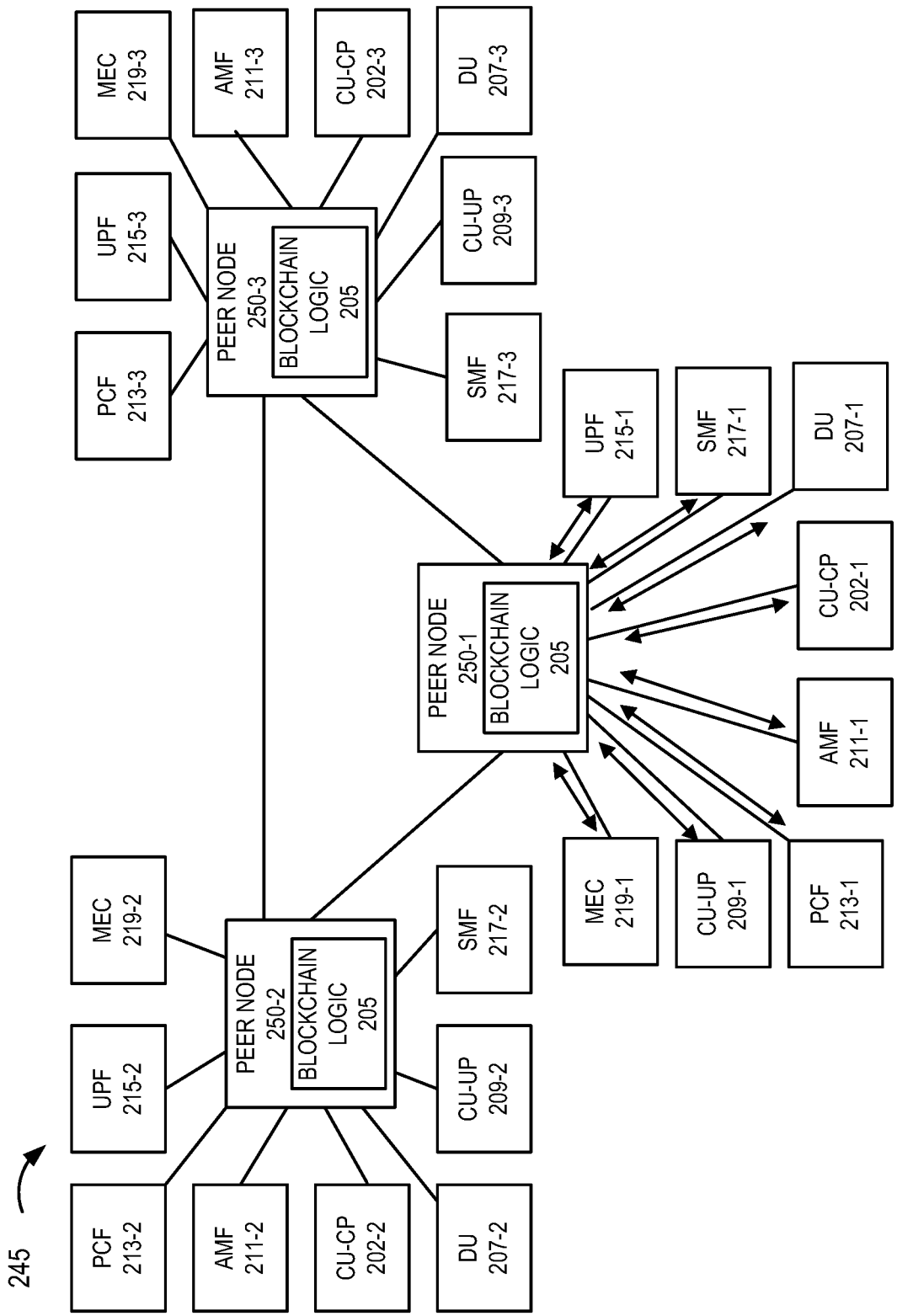
FIG. 2C is a diagram illustrating still another exemplary environment in which an exemplary embodiment of the blockchain-based network information management service may be implemented.

FIG. 2C is a diagram illustrating another exemplary environment 245 in which the blockchain-based network information management service may be implemented. For example, referring to FIG. 2C, peer nodes 250-1, 250-2, and 250-3 (also referred to as peer nodes 250, and individually or generally as peer node 250) may form a blockchain network. Peer node 250 may provide access to network information to various exemplary access devices 107, external devices 117, and core devices 122, such as DU 207, CU-UP 209, AMF 211, PCF 213, UPF 215, SMF 217, and MEC device 219. The number, arrangement, and type of blockchain devices (e.g., peer nodes 250) are exemplary. The blockchain network may include other types of nodes (e.g., ordering service node, etc.) not illustrated, as described herein. Additionally, the number, arrangement, and type of access devices 107, external devices 117, and core devices 122 are exemplary. For example, peer node 250 may service multiple DUs 207. Additionally, or alternatively, peer node 250 may service additionally, fewer, or different types of access devices 107, external devices 117, and/or core devices 122, as described herein. Peer node 250 may be deployed based on RAN design principles (e.g., one peer node shared among multiple tracking areas, etc.). Peer node membership determinations/establishment is beyond the scope of this description and is assumed to be established. The number and arrangement of communication links in FIG. 2C are exemplary. For example, the topology of a network that provides or supports the blockchain-based network information management service may include a mesh network, a partial mesh network, a bus, a star, or another type of topology.

According to various exemplary embodiments, peer node 250 may service access devices 107, external devices 117, and/or core devices 122 based on various configurable parameters, such as the type of network information (e.g., context information versus subscription information, etc.), devices that serve or support a network slice, devices of a particular geographic area, devices that support a particular type of application (e.g., ultra-reliable applications versus extreme real-time applications), and/or another network configurable criterion. As illustrated in FIG. 2C, CU-CP 202-1, DU 207-1, AMF 211-1, PCF 213-1, UPF 215-1, SMF 217-1, and MEC 219-1 may support communication with peer node 250-1. Similar communication (not illustrated) may occur with these devices associated with peer node 250-2 and peer node 250-3. For example, UPF 215-1 may access network information (e.g., a ledger, a block of a ledger, etc.) stored at peer node 250-1 for use in performing a UPF function. According to another example, UPF 215-1 may retrieve network information stored at peer node 250-1, and store the network information (e.g., a ledger, a block of a ledger, etc.) at UPF 215-1. Also, for example, CU-CP 202-1, DU 207-1, AMF 211-1, PCF 213-1, UPF 215-1, SMF 217-1, and MEC 219-1 may generate an update to one or more types of network information, and provide the update to peer node 250 for potential disbursement to other peer nodes 250 and associated access devices 107, external devices 117, and/or core devices 122 serviced by the other peer nodes 250. Peer node 250 may implement an update and dissemination procedures configured in the blockchain network. For example, endorsement and order service mechanisms may be implemented, as described herein.

Figure 2D:
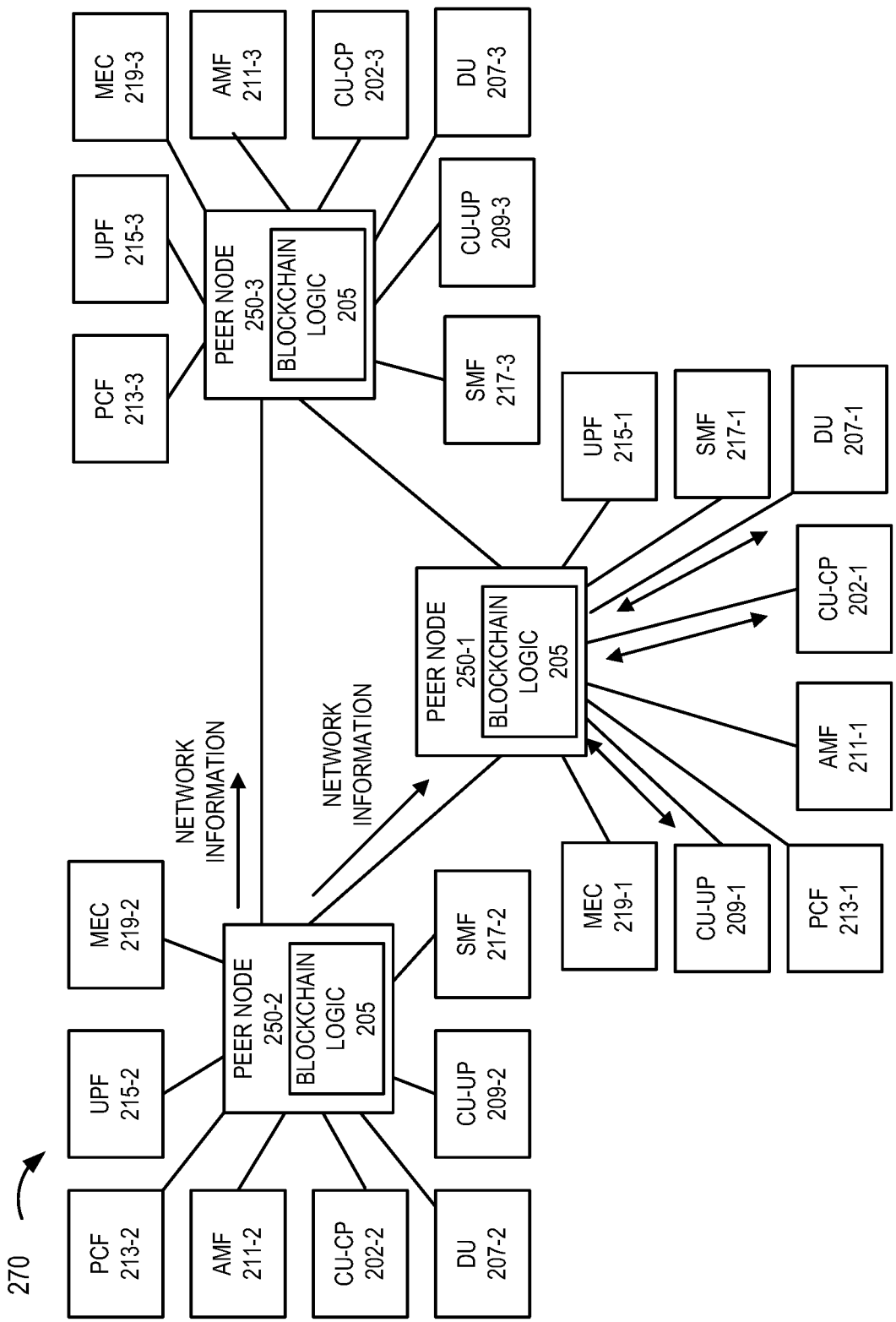
FIG. 2D is a diagram illustrating another exemplary process of the blockchain-based network information management service.

FIG. 2D is a diagram illustrating another exemplary process 270 of the blockchain-based network information management service. For example, assume that peer node 250-2 transmits network information to peer node 250-1 and peer node 250-3. As illustrated, CU-CP 202-1, DU 207-1, and CU-UP 209-1 may access or retrieve and store the updated network information. CU-CP 202-1, DU 207-1, and CU-UP 209-1 may use the updated network information to perform their respective RAN functions. According to other examples, additional or different access devices 107, external devices 117, and/or core devices 122 may access or retrieve and store the updated network information. For example, the access or retrieval and storage of the updated network information may depend on the type of network information and/or another configurable criterion, as described herein. For purposes of description, the updated network information may pertain to various exemplary scenarios associated with end device 130. For example, the updated network information may pertain to an initial attachment procedure with end device 130, a handover procedure, an existing application service session with an external device 117, an initial establishment of an application service session, a teardown of an application service session, or other occurrence that may relate to access device 107, external device 117, and/or core device 122 and the associated configuration or provisioning thereof in support of a wireless service and/or an application service. In this regard, a network device of a RAN, an external network, and/or a core network that may otherwise communicate with another network device of a RAN, an external network, and/or a core network according to a network standard (e.g., 3GPP, etc.) and associated interfaces (e.g., E1, F1-C, F1-U, NG-C, NG-U, point-to-point interfaces (e.g., N4, N7, N8, N10, N11, or other point-to-point interface), service-based interface (e.g., Namf, Nsmf, Npcf, Nnef, or other service-based interface), or other type of interfaces as described herein), may use blockchain-based network information management service that enables network information exchange among network devices in a secure manner based on blockchain mechanisms, such as peer nodes 250 of a blockchain network.

FIG. 3A is a diagram illustrating exemplary components of blockchain logic 205. For example, blockchain logic 205 may include a disseminator 305, a smart contractor 310, a ledger 315, and an endorser and policy enforcer 320. According to other exemplary embodiments, blockchain logic 205 may include additional, different, and/or fewer components, as described herein. For example, a hyperledger fabric architecture may include a membership component that may define rules in which identities are validated, authenticated, and allowed access to a network. The membership component may define the participatory rights of nodes (e.g., peers, orderers, etc.) and/or administrative and participatory rights at a channel level. Additionally, for example, an orderer component (not illustrated) may manage and establish a consensus on the order of transactions and may broadcast blocks to peers. The orderer component may perform other functions, such as manage network devices that may be allowed to create channels, enforce access control for channels, restrict which network devices can read and write data, and/or other configurable functions. In some embodiments, blockchain logic 205 of a network device may be different than another network device. For example, an ordering-service node may include blockchain logic that may not be included in a peer node. A blockchain architecture may include various types of nodes in a blockchain network that may support various roles and/or functions, such as a client, a peer (e.g., endorsing peer, committing peer, anchor peer, leading peer), an ordering service node, and so forth.

Referring to FIG. 3A, disseminator 305 may disseminate blocks of network information to other peer nodes provided by an ordering service of a blockchain architecture.

Smart contractor 310 may define transaction logic that controls the lifecycle of an object, such as the world state of a ledger. A smart contract may be defined within chaincode. The smart contract may run within a container environment or other virtualization entity. The chaincode may include an endorsement policy which may apply to the smart contract associated with it.

Ledger 315 may include a database management system (DBMS) that stores and manages (e.g., create, update, delete, etc.) a ledger. The ledger may include a world state and a blockchain pertaining to the network information, as described herein. The blockchain may include a transaction log that indicates all the changes that have resulted in the current world state.

As previously described, the blockchain-based network information management service may specify a defined structure for the network information. For example, a ledger of network information may be immutable in which each block of network information is complete and atomic (e.g., carries a single context). Additionally, the structure may define a limit on the number of blocks stored. For example, a threshold value N may indicate a maximum number of blocks to prevent alignment and/or storage issues at a network device. When the threshold value N is exceeded, the network device may delete a block based on its age and/or another configurable parameter. The structure may also define a hash function that provides sufficient protection of the ledger and associated network information.

According to an exemplary embodiment, the structure may designate a particular type of network device to provide certain blockchain functions. For example, a CU-CP may be designated to provide an ordering service (e.g., validating, committing, etc.) in the blockchain network. According to other examples, a different network device may be designated. For example, another type of access device 107, core device 122, or external device 117, as described herein, or a standalone or dedicated non-standard network device (e.g., non-3GPP network device, non-ITU network device, non-GSMA network device, etc.) may be implemented to perform a blockchain function, such as an ordering service, validating, and/or committing in relation to a transaction associated with the network information.

Endorser and policy enforcer 320 may manage and enforce the endorsement of a transaction. Endorser and policy enforcer 320 may validate before committal of the transaction. For example, a permissioned blockchain network may be implemented. Endorser and policy enforcer 320 may include a consensus algorithm. Additionally, in a hyperledger fabric network, there may be multiple channels that may support separation between multiple blockchains and members/sites. For example, private channels may be provisioned and defined for added confidentiality and partitioning of a blockchain network. According to various exemplary embodiments, an endorsement for an update to network information may be implemented in different ways, such as each transaction may be endorsed and signed by a subset of network devices (e.g., peer nodes or other type of nodes) before the transaction is committed, or the transaction may be endorsed by a network device (e.g., a centralized node).

Figure 3B:
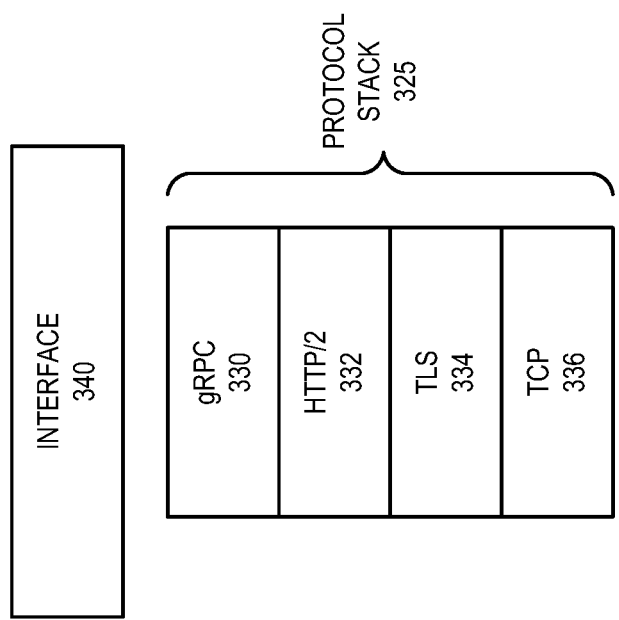
FIG. 3B is a diagram illustrating other exemplary components of the blockchain-based network information management service.

FIG. 3B is a diagram illustrating an exemplary embodiment of communication components of the blockchain-based network information management service. For example, a network device may include a protocol stack 325 that supports the blockchain-based network information management service, as described herein. According to an exemplary embodiment, protocol stack 325 may include a gRPC 330, a Hypertext Text Transfer Protocol (HTTP)/2 332, a Transport Layer Security (TLS) 334, and a Transmission Control Protocol (TCP) 336. gRPC 330 may include a Remote Procedure Call (RPC) system that provides for inter-service communications. For example, gRPC 330 may provide authentication, bidirectional streaming and flow control, blocking or nonblocking bindings, cancellation and timeouts. HTTP/2 332 may provide the functionality of a network transport protocol. TLS 334 may provide the functionality of a cryptographic protocol, such as providing security (e.g., privacy, data integrity, etc.) for communications across a network. TCP 336 may be implemented as the TCP. According to other exemplary embodiments, different components and/or protocols of a protocol stack may be implemented. Additionally, the network device may include an interface 340. As previously described, interface 340 may be a non-standard interface (e.g., non-3GPP interface, non-ITU interface, non-GSMA interface, etc.). Interface 340 may support a peer-to-peer protocol, such as Gossip protocol, instead of the client-server model in 3GPP, etc. Additionally, for example, a CU-CP may not use an F1-C interface to communicate network information to a DU, or the CU-CP may not use an E1 interface to communicate network information to a CU-UP.

Additionally, according to an exemplary embodiment, a hyperledger fabric network may implement a Gossip data dissemination protocol. For example, the Gossip protocol may manage peer discovery and channel membership, may disseminate ledgers across peers, and update newly connected peers and out-of-sync peers with appropriate network information.

FIG. 4 is a diagram illustrating yet another exemplary process 400 of an exemplary embodiment of the blockchain-based network information management service. As illustrated, assume there are peers 402-1 through 402-5 (also referred to as peer 402, and individually or generally as peer 402), and an ordering node 404. The number of peers 402 is exemplary. According to an exemplary embodiment, peer 402 may pertain to access device 107, external device 117, and/or core device 122, which may include blockchain logic 205, as illustrated in environment 200. According to another exemplary embodiment, peer 402 may pertain to peer node 250, as illustrated in environment 245 of FIG. 2C. According to this example, assume that peer 402 and ordering node 404 are a part of a permissioned blockchain network. For example, peer 402 and ordering node 404 may each have a cryptographic identify. The cryptographic identity may be secured by a private key and a public certificate, for example, or another appropriate security mechanism.

As illustrated, in step (1), peer 402-1 may generate and transmit a propose message to peer 402-2 and 402-3, which may provide endorsement services. The propose message may include proposed network information to be disseminated or transmitted (e.g., to other peers 402) and/or a proposed transaction. The transaction may be cryptographically signed. In step (2), upon receipt of the propose message, each of peer 402-2 and 402-3 may perform an endorsement service, such as verifying the signature and simulating the execution of the transaction against a smart contract, and/or perform another configured endorsement service (e.g., use of a centralized node that provides an endorsement service, a self-endorsement in which peer 402-1 may not transmit the propose message, etc.). According to this exemplary scenario, assume that the endorsement procedure yields a positive result, and peers 402-2 and 402-3 each transmits an endorsement response indicating an endorsement of the proposed transmission or transaction.

In step (3), in response to receiving the (positive) endorsements, peer 402-1 may transmit an order message, which may include the proposed block of network information/transaction and the endorsements (e.g., signatures, etc.), to ordering node 404. For example, according to various exemplary embodiments, ordering node 404 may be implemented by CU-CP 202 or another network device, as described herein. In response to receiving the order message, ordering node 404 may create block(s) of transaction(s) that may be distributed to peer 402 on a channel for final validation and commitment. For example, ordering node 404 may arrange an order of a transaction and may package the transaction into a block. Ordering node 404 may store an orderer's ledger pertaining to the transaction/block.

In step (4), ordering node 404 may transmit a block of network information to appropriate peers (e.g., of a channel pertaining to the transaction), such as peer 402-1. According to this exemplary scenario, peer 402-1 may transmit (e.g., using the Gossip protocol) the block to peer 402-2 and 402-3. Additionally, peer 402-2 may transmit (e.g., using the Gossip protocol) the block to peer 402-4 and 402-5. Peer 402 may validate each transaction in the block to ensure that the transaction has been endorsed and that the endorsement matches, and that it hasn't become invalidated by other recently committed transactions. After peer 402 successfully validates the transaction, peer 402 may update a ledger, for example. Additionally, for example, after the block is committed to the peer's ledger, peer 402 may generate an appropriate event. An application can register to be notified when such an event occurs.

Although not illustrated, when peer 402 is implemented as peer node 250, as described herein, process 400 may further include access device 107, external device 117, and/or core device 122 accessing the network information or retrieving and storing the network information from peer 402 for use, as described herein. When peer 402 is implemented as an access device 107, external device 117, and/or core device 122, peer 402 may use the network information to perform a function relating a DU, a CU-UP, a UPF, a MEC server, or other access device 107, external device 117, or core device 122, as described herein.

FIG. 5 is a diagram illustrating exemplary components of a device 500 that may be included in one or more of the devices described herein. For example, device 500 may correspond to access device 107, external device 117, core device 122, end device 130, peer node 250, ordering node 404, and/or other types of network devices, as described herein. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation, or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, learning, model-based, etc.

Memory/storage 515 includes one or multiple memories and/or one or multiple other types of storage mediums. For example, memory/storage 515 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. As an example, with reference to server device 210, software 520 may include an application that, when executed by processor 510, provides a function and/or a process of the blockchain-based network information management service, as described herein. Software 520 may also include firmware, middleware, microcode, hardware description language (HDL), and/or other form of instruction. Software 520 may also be virtualized. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces and/or wired interfaces. For example, communication interface 525 may include one or multiple transmitters and receivers, or transceivers. Communication interface 525 may operate according to a protocol stack and a communication standard. Communication interface 525 may include an antenna. Communication interface 525 may include various processing logic or circuitry (e.g., multiplexing/de-multiplexing, filtering, amplifying, converting, error correction, application programming interface (API), etc.). Communication interface 525 may be implemented as a point-to-point interface, a service-based interface, or a reference interface, for example.

Input 530 permits an input into device 500. For example, input 530 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 500 may be implemented in the same manner. For example, device 500 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., external network 115) and/or another type of network (e.g., access network 105, core network 120, etc.). Thus, network devices described herein may be implemented as device 500.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a function or a process described herein. Alternatively, for example, according to other implementations, device 500 performs a function or a process described herein based on the execution of hardware (processor 510, etc.).

Figure 6:
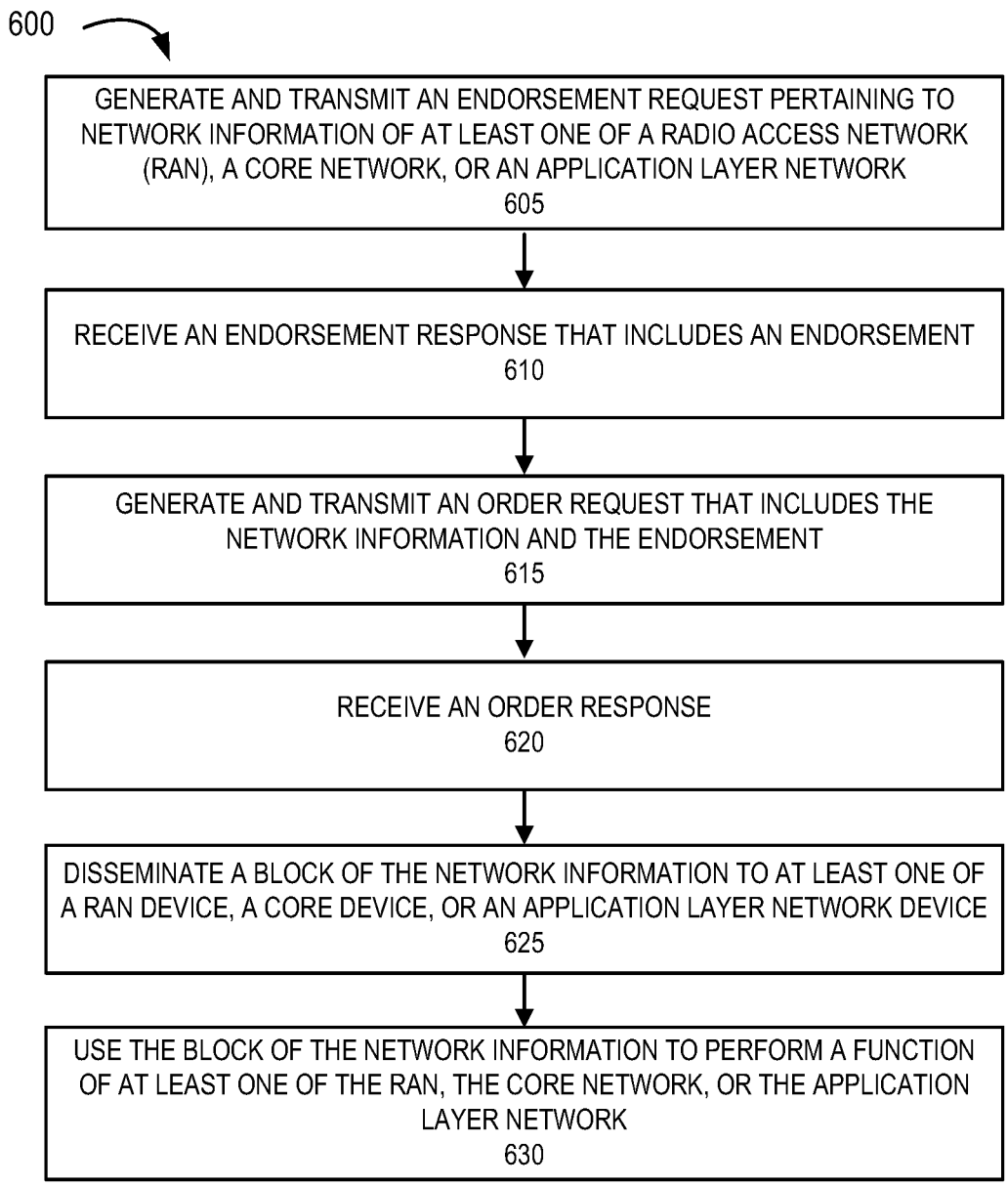
FIG. 6 is a flow diagram illustrating an exemplary process of an exemplary embodiment of the blockchain-based network information management service.

FIG. 6 is a flow diagram illustrating an exemplary process 600 of an exemplary embodiment of the blockchain-based network information management service. According to an exemplary embodiment, access device 107, external device 117, or core device 122 may perform a step of process 600. According to an exemplary implementation, processor 510 executes software 520 to perform the step of process 600, as described herein. Alternatively, the step may be performed by execution of only hardware. For purposes of description of process 600, access device 107, external device 117, or core device 122 that includes blockchain logic that provides the blockchain-based network information management service is referred to as a network device.

In block 605, a network device may generate and transmit an endorsement request pertaining to network information of at least one a RAN, a core network, or an application layer network. For example, the network device may transmit the endorsement request to one or multiple other peer network devices or a centralized network device that provides an endorsement service in a blockchain network.

In block 610, the network device may receive an endorsement response that includes an endorsement. According to this exemplary process, assume that the endorsement is positive. When the endorsement is a failure, the network device may perform one or more steps in accordance with an endorsement policy and/or another configuration of the blockchain network.

In block 615, the network device may generate and transmit an order request that includes the network information and the endorsement. For example, the network device may transmit the order request to another network device that provides an ordering service of the blockchain network.

In block 620, the network device may receive an order response. For example, the order response may include a block of network information that may be disseminated to other peer network devices of the blockchain network.

In block 625, the network device may disseminate the block of the network information to at least one of a RAN device, a core device, or an application layer network device (i.e., network device). The network device may disseminate the block of the network information using a P2P protocol, such as the Gossip protocol.

In block 630, the network device and the other network device may use the block of the network information to perform a function of at least one of the RAN, the core network, or the application layer network.

Although FIG. 6 illustrates an exemplary embodiment of a process of the blockchain-based network information management service, according to other exemplary scenarios, the blockchain-based network information management service may perform additional operations, fewer operations, and/or different operations than those illustrated and described.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIG. 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
    transmitting, by a network device, an endorsement request pertaining to network information of at least one of a radio access network (RAN), a core network, or an application layer network, wherein the network device is one of a RAN device, a core network device, or an application layer network device and a node of a blockchain network;
    receiving, by the network device responsive to the endorsement request, an endorsement response that includes an endorsement;
    transmitting, by the network device, an order request that includes the network information and the endorsement;
    receiving, by the network device responsive to the order request, an order response;
    transmitting, by the network device, a block of the network information to one or more other network devices of the RAN, the core network, or the application layer network, and of the blockchain network; and validating, by the network device after the transmitting of the block of the network information, that each transaction included in the block of the network information has not become invalidated by a previous committed transaction.

2. The method of claim 1, wherein the network information includes user equipment (UE) context information pertaining to an end device.

3. The method of claim 1, further comprising:
using, by the network device, the block of the network information to perform a function of the RAN device, the core network device, or the application layer network device.

4. The method of claim 1, wherein transmitting the block of the network information comprises:
transmitting, by the network device, the block of the network information to the one or more other network devices using a peer-to-peer protocol.

5. The method of claim 1, wherein the order response includes the block of the network information.

6. The method of claim 1, wherein a centralized unit control plane (CU-CP) device of the RAN provides an ordering service of the blockchain network.

7. The method of claim 1, wherein the network device is one of an access and management function (AMF), a user plane function (UPF), a session management function (SMF), or a policy control function (PCF) of the core network.

8. The method of claim 1, wherein the network device is one of a distributed unit (DU) device, a centralized unit control plane (CU-CP) device, a centralized unit user plane (CU-UP) device, or a next generation Node B (gNB) of the RAN.

9. A network device comprising:
a processor configured to:
transmit an endorsement request pertaining to network information of at least one of a radio access network (RAN), a core network, or an application layer network, wherein the network device is one of a RAN device, a core network device, or an application layer network device and a node of a blockchain network;
receive, responsive to the endorsement request, an endorsement response that includes an endorsement;
transmit an order request that includes the network information and the endorsement;
receive, responsive to the order request, an order response;
transmit a block of the network information to one or more other network devices of the RAN, the core network, or the application layer network, and of the blockchain network; and
validate, after the transmission of the block of the network information, that each transaction included in the block of the network information has not become invalidated by a previous committed transaction.

10. The network device of claim 9, wherein the network information includes user equipment (UE) context information pertaining to an end device.

11. The network device of claim 9, wherein the processor is further configured to:
use the block of the network information to perform a function of the RAN device, the core network device, or the application layer network device.

12. The network device of claim 9, wherein transmitting the block of the network information, the processor is further configured to:
transmit the block of the network information to the one or more other network devices using a peer-to-peer protocol.

13. The network device of claim 9, wherein the order response includes the block of the network information.

14. The network device of claim 9, wherein a centralized unit control plane (CU-CP) device of the RAN provides an ordering service of the blockchain network.

15. The network device of claim 9, wherein the network device is one of an access and management function (AMF), a user plane function (UPF), a session management function (SMF), or a policy control function (PCF) of the core network.

16. The network device of claim 9, wherein the network device is one of a distributed unit (DU) device, a centralized unit control plane (CU-CP) device, a centralized unit user plane (CU-UP) device, or a next generation Node B (gNB) of the RAN.

17. A non-transitory computer-readable storage medium storing instructions executable by a processor of a network device, which when executed cause the network device to:
transmit an endorsement request pertaining to network information of at least one of a radio access network (RAN), a core network, or an application layer network, wherein the network device is one of a RAN device, a core network device, or an application layer network device and a node of a blockchain network;
receive, responsive to the endorsement request, an endorsement response that includes an endorsement;
transmit an order request that includes the network information and the endorsement;
receive, responsive to the order request, an order response;
transmit a block of the network information to one or more other network devices of the RAN, the core network, or the application layer network, and of the blockchain network; and
validate, after the transmission of the block of the network information, that each transaction included in the block of the network information has not become invalidated by a previous committed transaction.

18. The non-transitory computer-readable storage medium of claim 17, wherein the instructions to transmit the block of the network information, further comprise instructions, which when executed cause the network device to:
transmit the block of the network information to the one or more other network devices using a peer-to-peer protocol.

19. The non-transitory computer-readable storage medium of claim 17, wherein the instructions further comprise instructions, which when executed cause the network device to:
use the block of the network information to perform a function of the RAN device, the core network device, or the application layer network device.

20. The non-transitory computer-readable storage medium of claim 17, wherein the network device is one of a distributed unit (DU) device, a centralized unit control plane (CU-CP) device, a centralized unit user plane (CU-UP) device, or a next generation Node B (gNB) of the RAN.

* * * * *